United States Patent [19]

Hagan

[11] Patent Number: 5,767,933
[45] Date of Patent: Jun. 16, 1998

[54] CAMOUFLAGE EYEWEAR

[76] Inventor: Timothy Hagan, 2976 Selma La., Farmers Branch, Tex. 75234

[21] Appl. No.: 731,068

[22] Filed: Oct. 9, 1996

[51] Int. Cl.$^6$ ............... G02C 11/02; G02C 7/10; G02C 9/00
[52] U.S. Cl. ............... 351/52; 351/44; 351/47
[58] Field of Search ............... 351/41, 44, 45, 351/46, 47, 51, 52, 163, 165; 359/885, 889

[56] References Cited

U.S. PATENT DOCUMENTS

| | | | |
|---|---|---|---|
| 4,673,609 | 6/1987 | Hill | 359/885 |
| 4,715,702 | 12/1987 | Dillon | 351/44 |
| 4,812,031 | 3/1989 | Evans | 351/47 |
| 5,157,426 | 10/1992 | Kronberg | 351/163 |
| 5,521,655 | 5/1996 | Rhoad | 351/51 |

*Primary Examiner*—Huy Mai
*Attorney, Agent, or Firm*—L. Dan Tucker

[57] ABSTRACT

Dual purpose eyewear for camouflaging a wearer's eyes. The eyewear comprises a pair of lens supported on a frame which positions the lens in front of the wearer's eyes. Shielding sidepieces are also supported by the frame and cooperate with the lens to camouflage and protect the eyes. The lens and sidepieces include a smooth surface for surface tension adhesion of a film material. The film material is cut into irregular shapes and sizes and is removably adhered to the lens and sidepieces in a random and arbitrary pattern. The pattern, while not substantially obstructing the wearer's vision, combines with the irregular shapes and sizes of the film material to create a camouflage effect of the eyeglasses and to conceal the whites of the wearer's eyes. The camouflage eyewear is readily converted to safety or tinted eyeglasses for unobstructed vision by removing the film material from the lens and sidepieces.

15 Claims, 1 Drawing Sheet

CAMOUFLAGE EYEWEAR

FIELD OF THE INVENTION

The present invention relates to camouflage eyewear comprising irregular shapes and sizes of camouflage film material removably adhered to eyeglasses in a random and arbitrary pattern, the eyewear readily converted to safety or tinted eyeglasses by removing the film material.

BACKGROUND OF THE INVENTION

Camouflage apparel is indispensable gear for hunting and wildlife photographic activities. It is difficult and many times impossible to capture on film wildlife in their natural habitat or to create the element of surprise required for a successful hunt without blending into and appearing as a natural part of the surrounding foliage. Wildlife will, however, respond naturally in the presence of a fully camouflaged human.

Conventional camouflage apparel includes clothing, shoes, socks, gloves, hats, and neckwear, as well as camouflage paint for covering any exposed skin. However, efforts to disguise the skin are futile if the eye region of the hunter's or photographer's eyes are not camouflaged as well. Wildlife are quick to spot the unfamiliar eye region and whites of human eyes which are much sharper in color and exhibit more white than that of wildlife. Thus, wildlife are warned away when seeing the unusual contrast of the human eye in the natural foliage.

While camouflaging the human eyes is essential to a successful outing, the hunter or photographer must have substantially unobstructed vision to spot the target, take aim and shoot. Obstructed vision increases the danger that the target is not the desired wildlife but rather an animal of a protected species or a human or other object.

Although camouflage eyewear is required when stalking wildlife to prevent the target from being warned away, the camouflage properties of eyewear are not required at all times during the hunting or photographic activity and are undesirable when totally unobstructed vision is necessary. Eye protection is, however, almost always warranted, either to shield one's eyes from the sun or elements or from foreign objects which may enter and hurt the eyes, either temporarily or permanently. In addition, the need to travel light for most photographic and hunting activities is great since the terrain is oftentimes rugged and travel is accomplished by foot or horseback. While single purpose glasses are adequate for their intended use, eyewear having camouflage properties but readily converted to safety or tinted glasses for totally unobstructed vision serves dual purposes while allowing one to travel light.

Conventional methods to camouflage the eyes of the hunter or photographer include shielding one's eyes by closing them or lowering one's head after the wildlife is initially spotted. The hunter or photographer then listens for the approaching wildlife, and, when the movement is near, opens the eyes or raises the head and shoots the camera or firearm. While employing these methods may prevent the wildlife from being warned away, the hunter or photographer is not allowed the opportunity to deliberate his decision to shoot or even to aim. Thus, a good shot is seldom possible. Moreover these methods are dangerous as the target may not be the contemplated wildlife but rather an animal of a protected species or a human.

Conventional camouflage eye gear includes eyeglasses on which camouflage patterns and colors are silkscreened or otherwise permanently affixed to the eyeglass material. While these eyeglasses are singly suitable for use as camouflage apparel, they cannot function as safety or tinted glasses when totally unobstructed vision is required.

SUMMARY OF THE INVENTION

In accordance with the present invention, camouflage eyewear comprises a pair of lens supported on a frame that passes over a wearer's nose and around the ears to position the lens in front of the wearer's eyes. Shielding sidepieces are also supported by the frame proximate to the lens and cooperate with the lens to further camouflage the eyes and protect them from the sun, wind, and other elements and foreign objects.

The lens and sidepieces include a smooth surface to facilitate surface tension adhesion of a film material having surface adhering properties. A suitable adhesive film material is polyvinyl chloride, although other materials having surface adhering properties are appropriate. The film material is cut into irregular shapes and sizes and is removably adhered to the lens and sidepieces in a random and arbitrary pattern which does not substantially obstruct the wearer's vision. The irregular shaped and sized film material, in combination with its random and arbitrary placement on the lens and sidepieces, create a camouflage effect of the eyeglasses and conceal the whites of the wearer's eyes. The film material can be of several different tints and arranged on the lens and sidepieces in random and arbitrary patterns to mimic various natural colorations and surroundings.

The lens and sidepieces of the eyewear are constructed of a suitable material such as polycarbonate scratch resistant material to prevent scratches and scrapes from obstructing the vision of the wearer. Further, the material for the lens and sidepieces can be clear for wear during low lighting conditions in the early morning or late afternoon. The lens and sidepieces can also be constructed of tinted material to provide glare and sun protection during bright sunny days.

The camouflage eyewear of the present invention is readily converted to safety or tinted eyeglasses by removing the camouflage film material from the lens and sidepieces. The dual capability of the eyewear allows the wearer to travel light.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE PREFERRED EMBODIMENT

Figure 1:
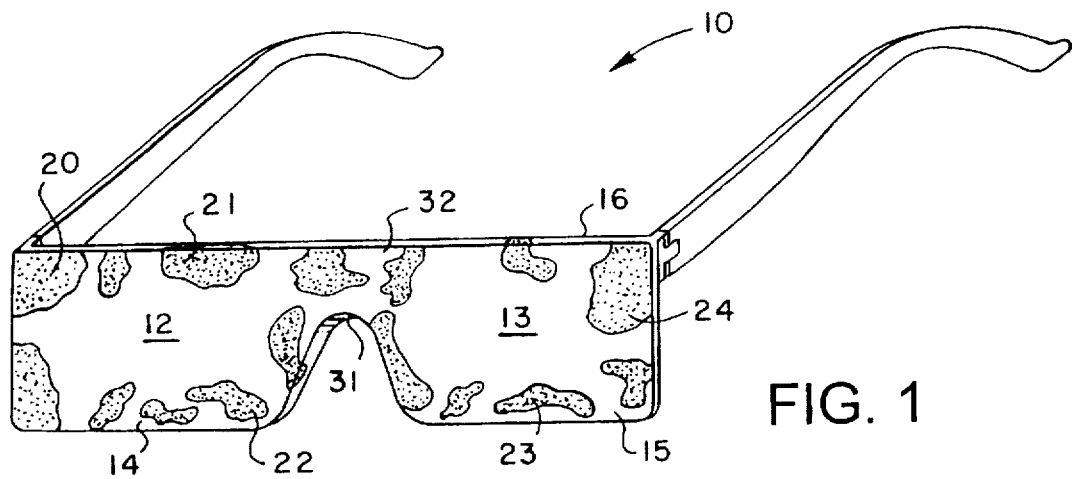
FIG. 1 provides a perspective view of the camouflage eyewear of the invention.

Referring to FIG. 1, eyewear 10 for camouflaging the eye region and whites of a wearer's eyes includes a pair of lens 12, 13 supported by a frame 16 which passes over a wearer's nose and around the ears to position the lens 12, 13 in front of the wearer's eyes. The lens 12, 13 include smooth surfaces 14, 15 to facilitate surface tension adhesion of a film material 20 having surface adhering properties. A suitable adhesive film material 20 is polyvinyl chloride, although it will be appreciated that any film material having surface adhesion properties can be utilized. The film material 20 is cut into irregular shapes and sizes, exemplified by reference numbers 21, 22, 23 and 24, and is removably adhered to the smooth surfaces 14, 15 of the lens 12, 13 in a random and arbitrary pattern. It will be appreciated that any random and arbitrary pattern is suitable. As is evident from FIG. 1, the irregular shapes and sizes 21, 22, 23 and 24, of the film material 20 can be adhered to the lens 12, 13 in a pattern which provides substantially unobstructed vision for the wearer. This pattern is characterized by the placement of the irregular shapes and sizes of the film material 20 proximate to nose areas 31, 32 and around the periphery of the lens 12, 13.

The irregular shapes and sizes 21, 22, 23 and 24 of the film material 20, in combination with the random and arbitrary pattern of the film material's placement on the lens 12, 13, create a camouflage effect of the eyewear 10 with the natural surroundings and conceal the eye region and whites of the wearer's eyes.

Figure 2:
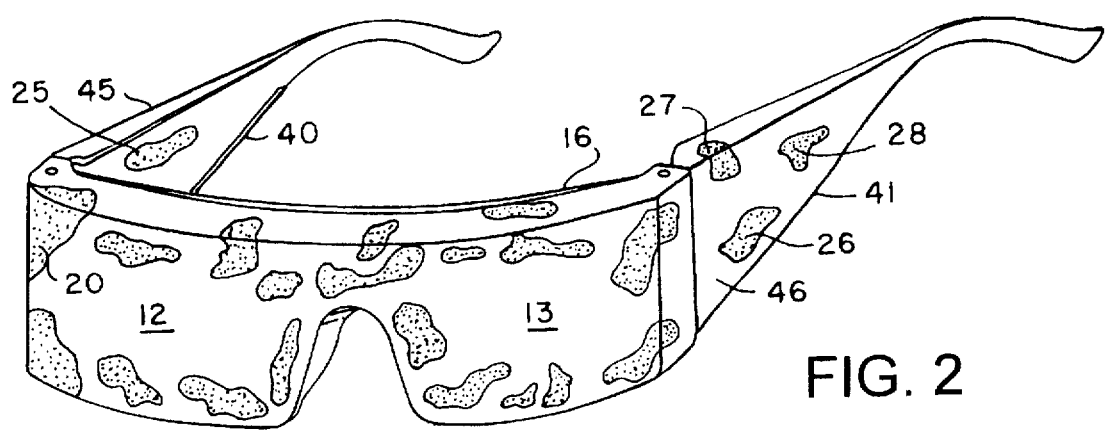
FIG. 2 provides a perspective view of a second embodiment of the invention.
Figure 3:
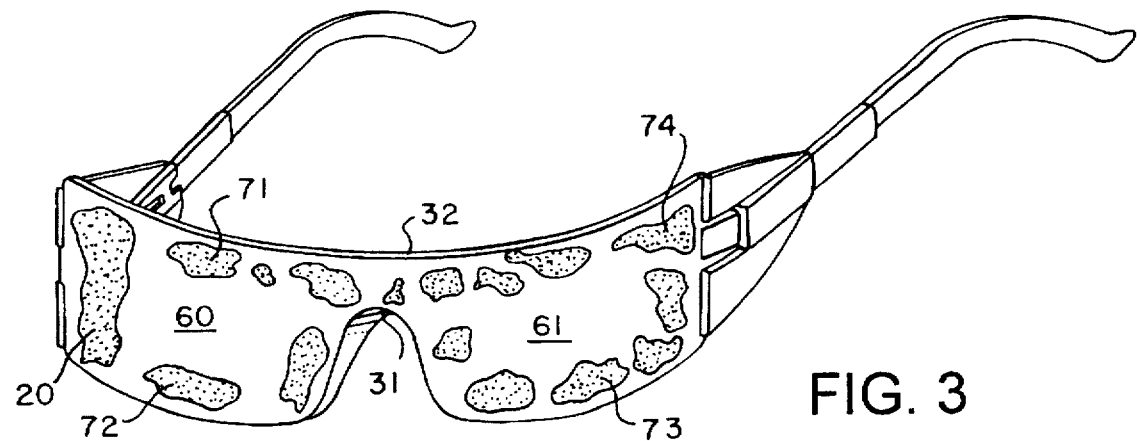
FIG. 3 provides a perspective view of a third embodiment of the invention.

By referring to FIGS. 2 and 3, second and third preferred embodiments of the instant invention are illustrated. As shown by a second preferred embodiment of FIG. 2, further camouflage of the wearer's eyes is accomplished by sidepieces 40, 41 which are integral with the frame 16 proximate to the lens 12, 13. The sidepieces 40, 41 include smooth surfaces 45, 46 for surface adhesion of the film material 20. The film material 20, cut in irregular sizes and shapes as exemplified by reference numbers 25, 26, 27, and 28, is removably adhered to the sidepieces 40, 41 in a random and arbitrary pattern. It will be appreciated that any random and arbitrary pattern is suitable. As is evident from FIG. 2, the irregular shapes and sizes 25, 26, 27 and 28, of the film material 20 can be adhered to the sidepieces 40, 41 in the pattern which provides substantially unobstructed peripheral vision for the wearer. This random and arbitrary pattern is characterized by the placement of the irregular shapes and sizes 25, 26, 27, and 28 of the film material 20 proximate to the periphery of the sidepieces 40, 41.

In a third embodiment shown in FIG. 3, the lens 60, 61 are configured to wrap around the wearer's eyes to camouflage the fronts and sides of the eyes. The film material 20 is removably adhered to the lens 60, 61 in random and arbitrary patterns. The pattern is characterized by the placement of the irregular shapes and sizes of the film material 20 proximate to nose areas 31, 32 of the lens 60, 61. The pattern is also characterized by the placement of the irregular shapes and sizes as exemplified by reference numbers 71, 72, 73 and 74 of the film material 20 proximate to the periphery of the wraparound lens 60, 61. The patterns provide substantially unobstructed front and peripheral vision for the wearer while camouflaging the wearer's eyes.

The film material that is utilized in this invention is preferably a flexible plastic material that has sufficient surface adhering properties whereby it can be cut into random shapes and sizes and then adhered to the flat smooth lens surfaces and frame surfaces of hunter's eyewear. One particularly preferred type of plastic material is sheet polyvinyl chloride that is used in such other applications as window tinting and the like. The sheet material can either be precut to random sizes or it can be sold as a continuous sheet with an appropriate release backing to allow the user to cut the sheet and shape it into an desired configuration. In a preferred embodiment, the sheet material will be sold in kit form with either precut random shaped portions of the film material or as a continuous sheet.

The sheet material as utilized in this invention can be in a variety of colors. Normally, it will be desired to utilize colors that are compatible with the natural background of vegetation, rocks and other terrain features where the hunter or photographer will be working. For example, in lush green terrain, it may be desirable to utilize a sheet material having varying hues of green. In other instances such as in fall or winter conditions, the sheet material may be colored in various brown tones or grey or black tones.

It is desirable to provide the film material to the user on some type of a release sheet such as waxed or slick paper whereby the sheet material can be peeled from the release backing and applied to the eyewear. As previously mentioned, since the sheet material is releasably adhered to the eyewear, it is desirable for the user to retain the release backing whereby the random shapes of the sheet material can be peeled from the eyewear and reapplied to the release backing for subsequent use.

It will be appreciated that the colored sheet material can be most conveniently sold in kit form whereby the user can custom make whatever camouflage designs as may be desirable from the conditions of the terrain where it is used. Therefore, the kit may contain a variety of colors of film material as well as a variety of preformed or precut pieces of the film for camouflaging the eyewear.

Since the film material is applied to the eyewear in a releasable fashion, it may be desirable to moisten the surface of the film material to increase its abilities to adhere to the eyewear. This moistening can be in the form of water, glycerine and other liquids to improve the adhering properties of the film.

It will be appreciated that various changes and modifications may be made in the foregoing disclosure and the structures illustrated in the Figures but without departing from the spirit and scope of the invention.

I claim:

1. Camouflage eyewear comprising:
   eyeglasses having a frame and a pair of lens supported by said frame, said lens having smooth surfaces to facilitate surface tension adhesion of a film material; and
   a plurality of irregular shapes and sizes of film material having surface adhering properties, said film material removably adhered to said smooth surfaces of said lens in a random and arbitrary pattern for camouflaging said eyeglasses.

2. Camouflage eyewear, as recited in claim 1, wherein said random and arbitrary pattern comprises said plurality of film material removably adhered around the peripheral of said lens to provide substantially unobstructed vision to a wearer.

3. Camouflage eyewear, as recited in claim 1, wherein said lens are tinted to protect a wearer's eyes from the sun.

4. Camouflage eyewear, as recited in claim 1, wherein said lens are comprised of a polycarbonate scratch resistant material.

5. Camouflage eyewear comprising:
   eyeglasses having a frame and a pair of lens supported by said frame, said lens constructed of a polycarbonate scratch resistant material which is tinted to protect a wearer's eyes from the sun, said lens further comprising smooth surfaces to facilitate surface tension adhesion of a film material; and
   a plurality of irregular shapes and sizes of film material having surface adhering properties, said film material removably adhered to said smooth surfaces of said lens in a random and arbitrary pattern for camouflaging said eyeglasses.

6. Camouflage eyewear comprising:

eyeglasses having a frame, a pair of lens supported by said frame, and a pair of sidepieces integral with said frame proximate to said lens, said lens and sidepieces having smooth surfaces to facilitate surface tension adhesion of a film material; and a plurality of irregular shapes and sizes of film material having surface adhering properties, said film material removably adhered to said smooth surfaces of said lens and sidepieces in a random and arbitrary pattern for camouflaging said eyeglasses.

7. Camouflage eyewear, as recited in claim 6, wherein said random and arbitrary pattern comprises said plurality of film material removably adhered around the peripheral of said lens and sidepieces to provide substantially unobstructed vision to a wearer.

8. Camouflage eyewear, as recited in claim 6, wherein said lens and sidepieces are tinted to protect a wearer's eyes from the sun.

9. Camouflage eyewear, as recited in claim 6, wherein said lens and sidepieces are comprised of a polycarbonate scratch resistant material.

10. Camouflage eyewear comprising:

eyeglasses having a frame, a pair of lens supported by said frame, and a pair of sidepieces integral with said frame proximate to said lens, said lens and sidepieces constructed of a polycarbonate scratch resistant material which is tinted to protect a wearer's eyes from the sun, said lens and sidepieces further comprising smooth surfaces to facilitate surface tension adhesion of a film material; and a plurality of irregular shapes and sizes of film material having surface adhering properties, said film material removably adhered to said smooth surfaces of said lens and sidepieces in a random and arbitrary pattern for camouflaging said eyeglasses.

11. Camouflage eyewear comprising:

eyeglasses having a frame and a pair of lens supported by said frame, said lens comprising a wrap around configuration to cover the fronts and sides of a wearer's eyes, said lens further comprising smooth surfaces to facilitate surface tension adhesion of a film material; and a plurality of irregular shapes and sizes of film material having surface adhering properties, said film material removably adhered to said smooth surfaces of said lens in a random and arbitrary pattern for camouflaging said eyeglasses.

12. Camouflage eyewear, as recited in claim 11, wherein said random and arbitrary pattern comprises said plurality of film material removably adhered around the peripheral of said lens to provide substantially unobstructed vision to a wearer.

13. Camouflage eyewear, as recited in claim 11, wherein said lens are tinted to protect a wearer's eyes from the sun.

14. Camouflage eyewear, as recited in claim 11, wherein said lens are comprised of a polycarbonate scratch resistant material.

15. Camouflage eyewear comprising:

eyeglasses having a frame and a pair of lens supported by said frame, said lens comprising a wrap around configuration to cover the fronts and sides of a wearer's eyes and constructed of a polycarbonate scratch resistant material which is tinted to protect a wearer's eyes from the sun, said lens further comprising smooth surfaces to facilitate surface tension adhesion of a film material; and a plurality of irregular shapes and sizes of film material having surface adhering properties, said film material removably adhered to said smooth surfaces of said lens in a random and arbitrary pattern for camouflaging said eyeglasses.

\* \* \* \* \*